United States Patent

[11] 3,549,178

[72] Inventor Evert Flink
Nynashamn, Sweden
[21] Appl. No. 781,549
[22] Filed Dec. 5, 1968
[45] Patented Dec. 22, 1970
[73] Assignee Rederiaktiebolaget Nordstjernan,
Nynashamn, Sweden
a Swedish Joint Stock company
[32] Priority Dec. 6, 1967
[33] Sweden
[31] No. 16749/67

[54] JOINT
10 Claims, 9 Drawing Figs.
[52] U.S. Cl. ..................................... 285/187,
285/368
[51] Int. Cl. ..................................... F16l 55/00
[50] Field of Search ........................................... 285/187,
47—50, 368, 414, 41(Cursory), 174(Cursory),
129, (Glass Digest)

[56] References Cited
UNITED STATES PATENTS
2,695,184 11/1954 Hobbs ........................ 285/187X Primary Examiner—David J. Williamowsky
Assistant Examiner—Wayne L. Shedd
Attorney—Sommers & Young ABSTRACT: A joint structure is provided to compensate for motion due to temperature variations between a comparatively fragile element, e.g., fabricated of quartz, and a comparatively strong element, e.g., fabricated of metal, having sealing means therebetween. A coupling member is connected to the comparatively strong element, and supports a pressure member which engages a surface of the comparatively fragile element adjacent the sealing means. The shape and expansion coefficients of the several members forming the joint are preselected in relation to one another so that, upon occurrence of temperature variations, the pressure member remains stationary relative to the surface of the fragile element which it engages, whereby the contact pressure between said pressure member and surface, and the pressure between said elements and said sealing means, are maintained substantially constant.

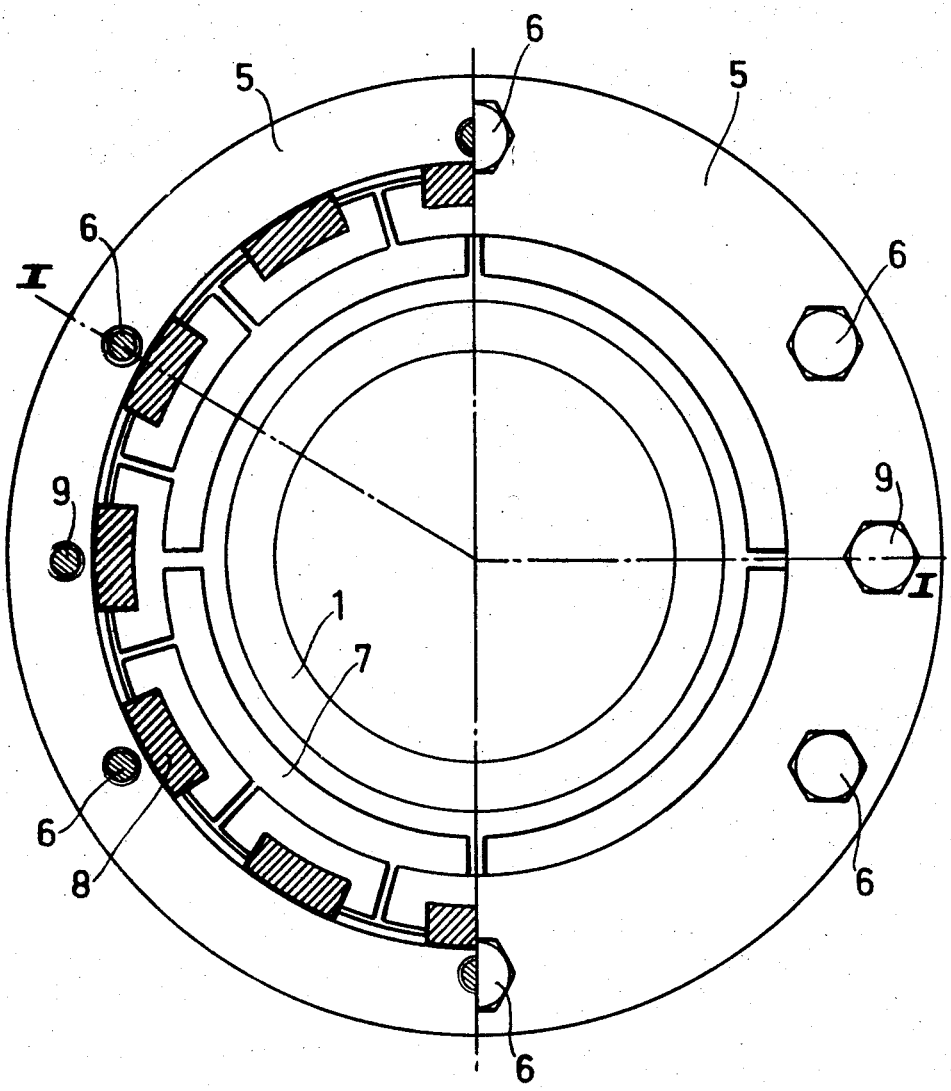

EVERT FLINK - Inventor

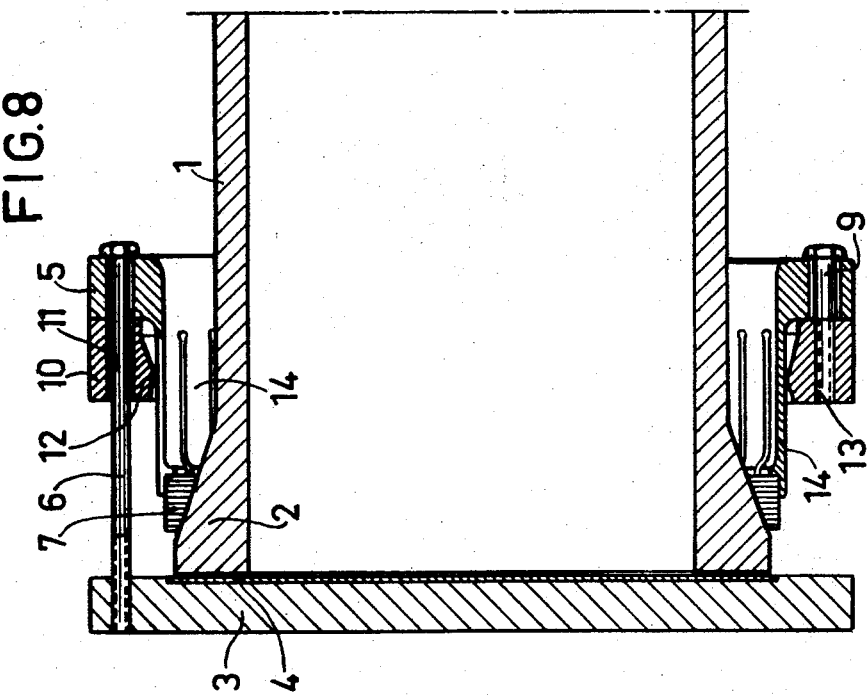
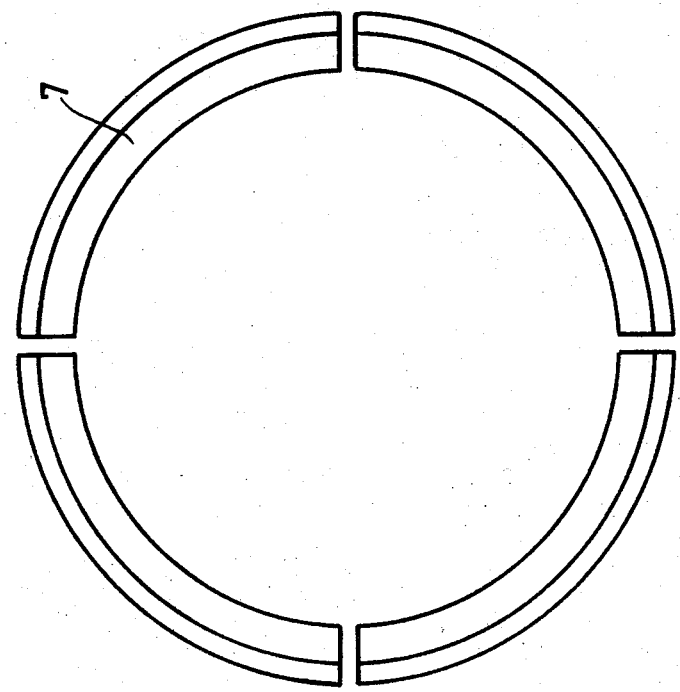

JOINT

When structural elements constructed of materials with different expansion coefficients are jointed together, temperature variations will cause the elements to move relative to one another, the motions being of such a magnitude, that the sealing or strength of the joint can be jeopardized.

In certain processes, for example, parts constructed of quartz material have to be united with parts constructed of metal, e.g. stainless steel, Inconel or similar metals. When connections of this type are required to operate at high temperatures, for example at approximately 500° C., problems are caused by different expansion coefficients of the materials.

During tests carried out with known joints between a steel flange and a pipe of quartz material, a leak developed in the joint during the period the joint was subjected to a temperature increase. Bolts in the joint had to be retightened for rendering the joint to remain tight at the high temperature. When the temperature was being lowered, the steel flanges around the quartz material shrunk to such a degree that the quartz material was crushed.

When tests were carried out with cup springs placed below longer bolts, they did not result in the desired safety, either. These tests have shown, that in such a case the springs must be cooled and the support member against the quartz material must have a bearing with very low friction. These two conditions are difficult to meet at the temperature in question.

The aforesaid problems have been solved by the joint according to the present invention, which is based on the feature that materials with different expansion coefficients are chosen and so designed, that their composite motions do not affect the dimensions which are essential for the tightness and strength of the connection, i.e. motions at the critical places are at least substantially eliminated.

The invention, thus, more precisely refers to a joint adapted to compensate for motions due to temperature variations in a connection of structural elements sealingly coupled together, in such a manner, that the sealing safely is maintained and the strength of the elements is not jeopardized. The invention relates particularly to a joint adapted for use at great temperature variations, between structural elements made of materials with different expansion coefficients, such as, for example, a joint for coupling together a comparatively fragile quartz element with a comparatively strong steel element. The invention is substantially characterized by a joint which comprises a coupling member disposed in spaced relationship to the elements. The coupling member is connected to one of the elements by a holding member, and is coupled together with a support member the other element via a pressure member, which holds the support member in pressure contact with said other element and against which is supported a clamping member united with the coupling member. The shape and the expansion coefficients of the members comprised in the joint are so adjusted in relation to each other, upon occurrence of temperature variations, said contact pressure as well as the sealing pressure are maintained substantially constant.

In a preferred embodiment the pressure member may comprise one or a plurality of links mounted in the coupling member and engaging with the support member. As an alternative, especially at lower loads, the pressure member may comprise one or several tongues designed in one piece with the coupling member and engaging with the support member.

In a joint between a pipe and a flange, according to the invention the coupling member and the clamping member preferably are annular elements disposed concentrically in relation to the pipe, and the support member is an annular member radially slit open to form several segments.

The invention is described in greater detail in the following, with reference to the accompanying drawings showing two embodiments of the invention.

FIG. 2 shows a partial section along the line IIa–IIa in FIG. 1b as well as a view along line IIb–IIb in FIG. 1b.

Figure 6:
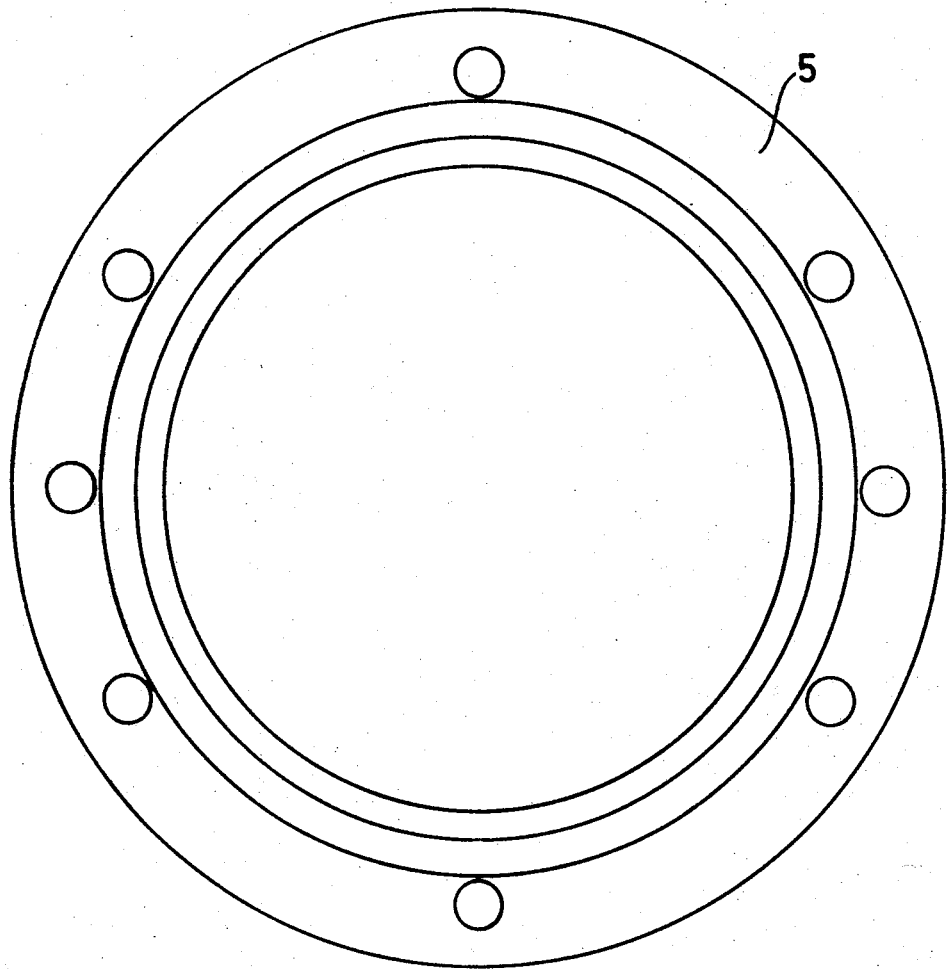
Figure 7:
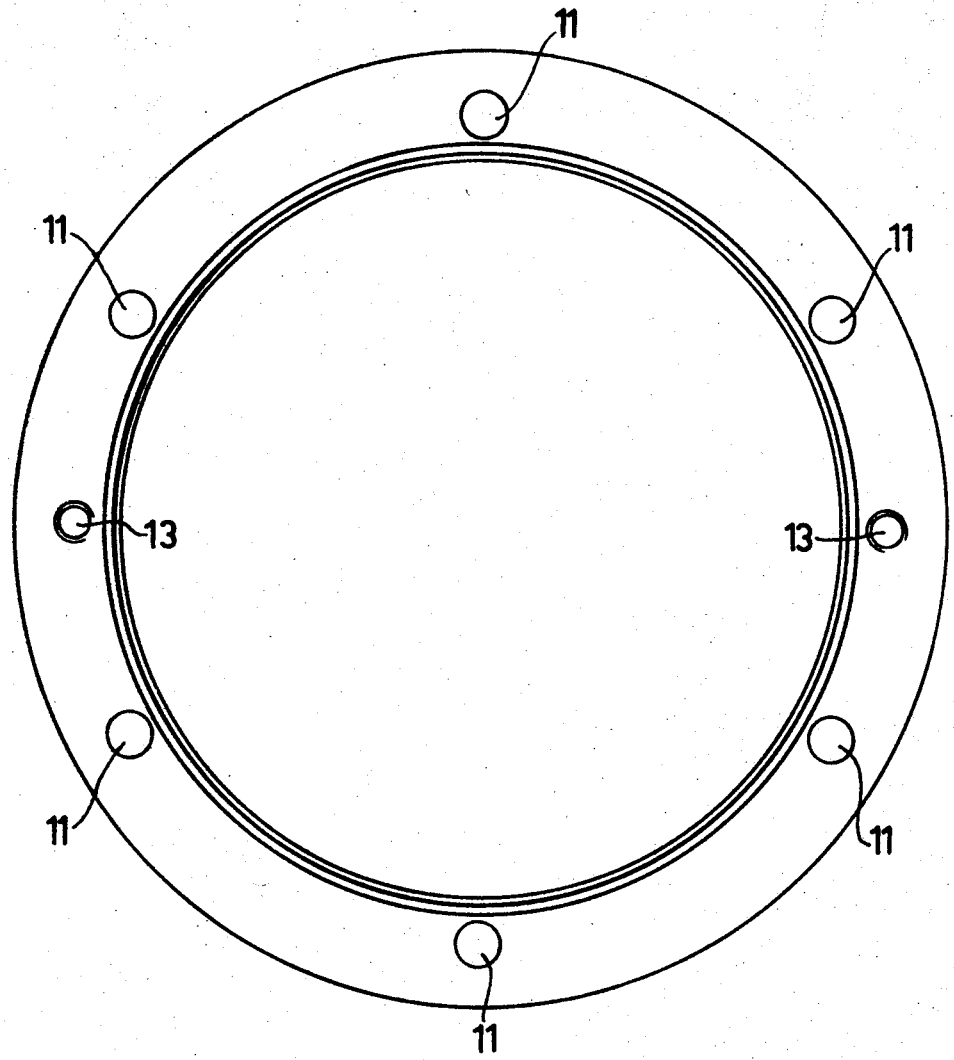

FIGS. 5—7 show separate end views of members comprised in the joint; and

Figure 1A:
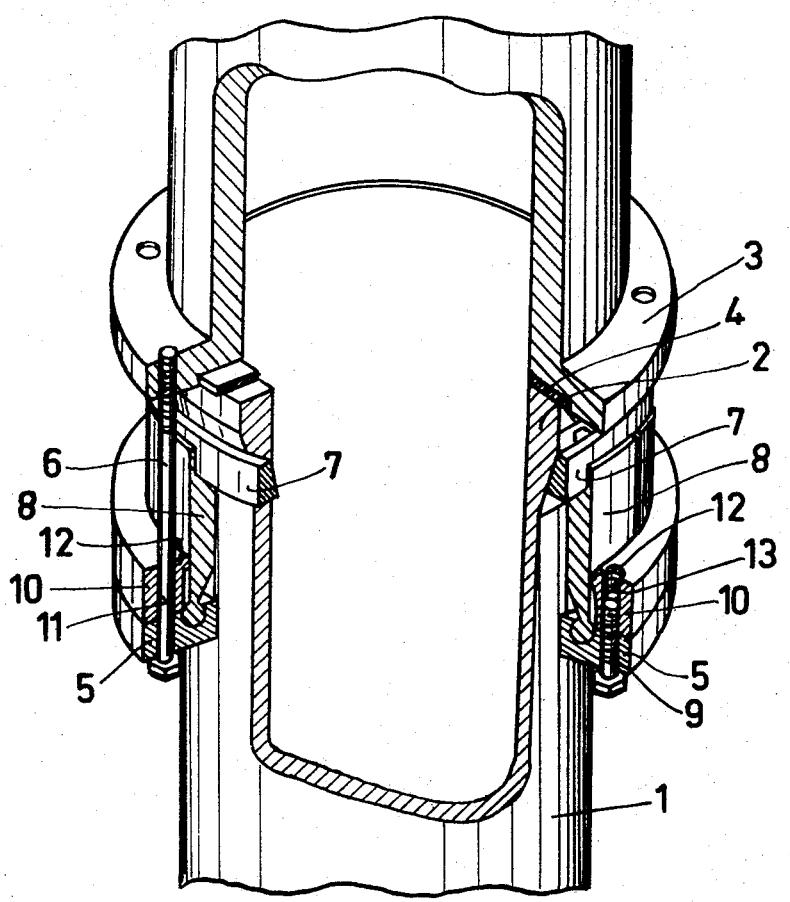
FIG. 1a shows a first embodiment of a joint according to the invention in a perspective slit open view.
Figure 1B:
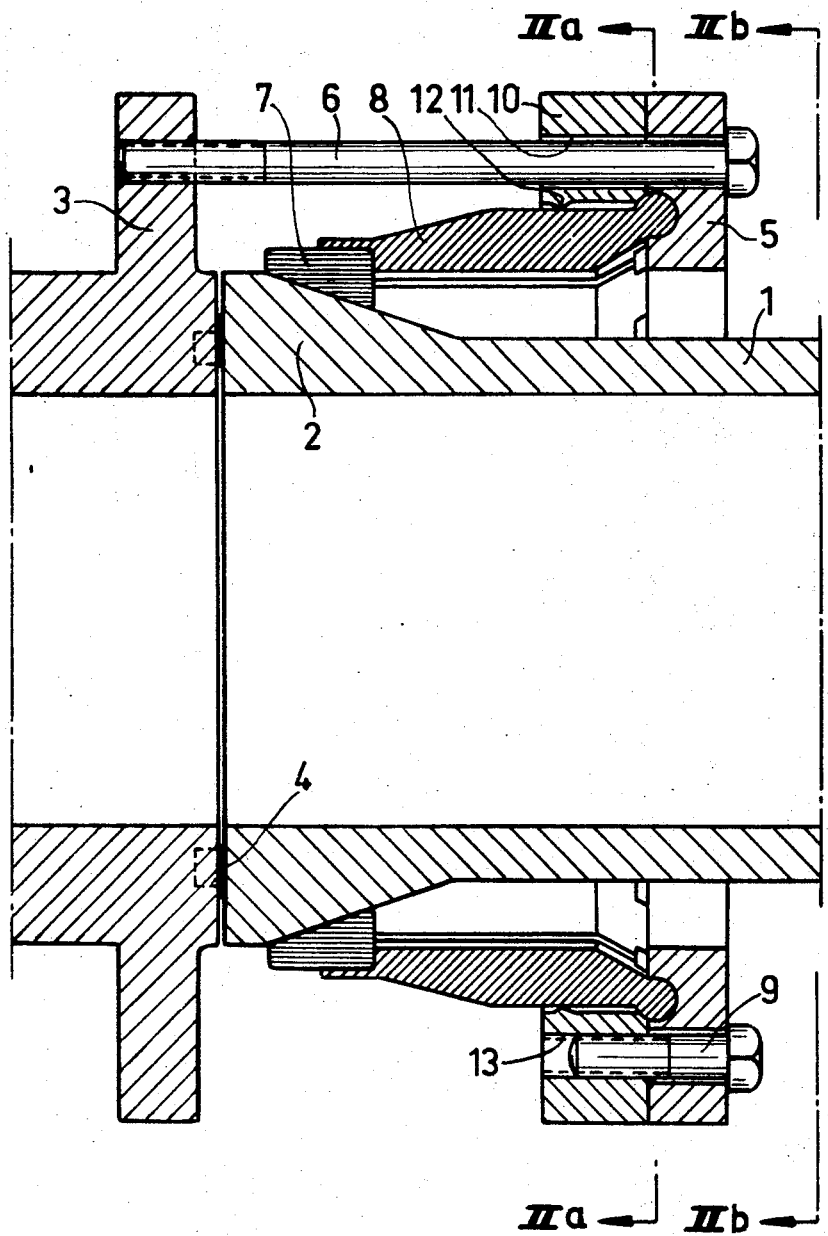
FIG. 1b shows the joint along a section along the line I–I in FIG. 2.

FIG. 8 shows, by a section corresponding to that of FIG. 1b, another embodiment of the invention.

The embodiments shown are constructed particularly for coupling together a pipe 1 of quartz material having a standard flange 2 with a pipe of steel having a flange 3, a sealing member 4 being placed between said flanges 2 and 3.

Figure 3:
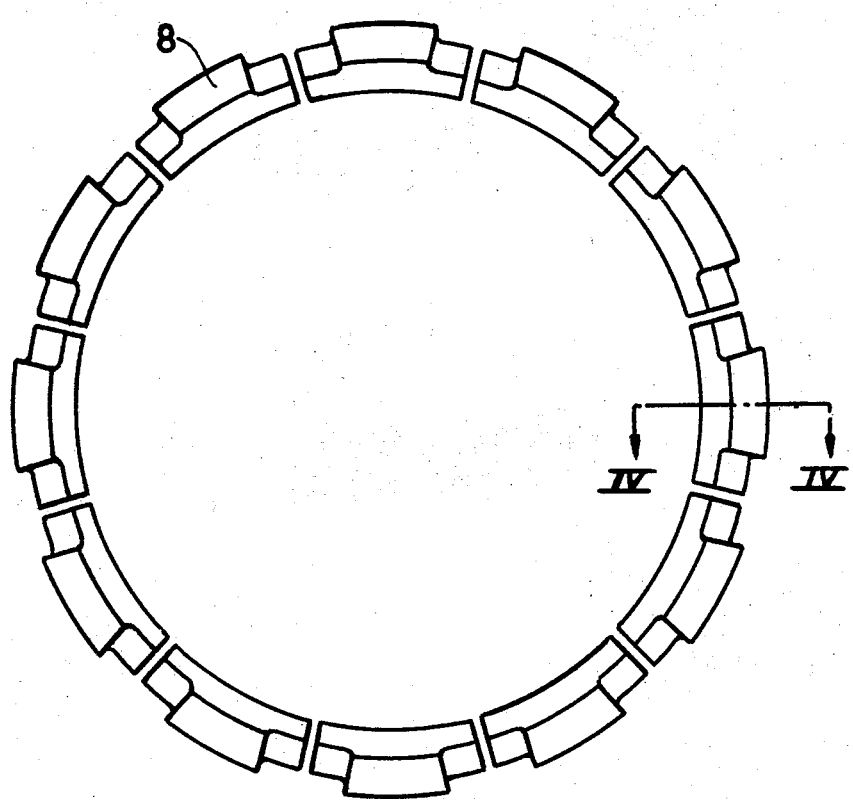
FIG. 3 shows by an end view links comprised in the joint.
Figure 4:
FIG. 4 shows a section through a link along the line IV–IV in FIG. 3.

The joint proper comprises an annular coupling member or counterflange 5 mounted concentrically in relation to the flange 3 and pipe 1, and is shown in greater detail in FIG. 6. Said coupling member 5 is secured to the flange 3 by six screws 6. The coupling member 5 is connected also to a support member 7 abutting to the pipe flange 2, the connection being made via links 8 each of which has one end mounted in the coupling member 5 and its other end in engagement with the support member 7. As appears most clearly from FIG. 5, the support member 7 is of annular shape and radially slit open to form loose segments, its diameter being determined by the support in the links 8 and the abutment to the pipe flange 2. The shape and number of the links 8 will be apparent from FIGS. 3 and 4. To the coupling member 5 is secured, by screws 9, a clamping member 10 which is provided with through holes 11 for the screws 6 and with threaded holes 13 for the screws 9. The clamping member 10 is provided with an inner bead 12 extending all around the member 10 and abutting the links 8.

When the joint is assembled as described, an adjusted sealing pressure is maintained between the flanges 2 and 3, and a suitable contact pressure is obtained against the flange 2 of quartz material via the support member 7, the links 8, the coupling member 5 and the clamping member 10. The contact pressure chosen, as well as the sealing pressure, are effected by tightening the screws 6, which unite the joint.

The embodiment shown in FIG. 8 differs from that shown in FIGS. 1—7 only in that the separate links 8 are replaced by tongues 14 formed in one piece with the coupling member 5. This embodiment, as an alternative, is better adapted for use at lower loads.

When the connection, with joint assembled, is subjected to increasing temperatures, the coupling member 5 expands with a certain expansion coefficient, and extends in the radial as well as axial direction.

The radial extension is compensated for by reason of the fact that the clamping member 10 also extends with an expansion coefficient adjusted to the expansion coefficient of the coupling member 5, and the resultant support for the links 8, or in the alternative embodiment for the tongues 14, is such that the bearing of the support member 7 on these links or tongues always lies on the same diameter.

The total axial extension of the coupling member 5 and links 8 is compensated for, in that the screws 6 are made of a material having an expansion coefficient adapted to that of the coupling member and links, and are given a suitable length.

As a result thereof, the motions caused by temperature variations in the members comprised in in the connection compensate for themselves with respect to clamping force, so that the sealing pressure between the pipe 1 and flange 3 and the contact pressure against the pipe flange 2 substantially are maintained also at variations of the temperature.

The invention, of course, is not restricted to the embodiments described above and shown in the drawings, but may be varied in different ways within the scope of the invention. The shapes and the materials chosen for the members comprised in the joint, for example, may be varied and adjusted to appliances of different kind, which may include material of a type other than mentioned above and also may comprise types of details coupled together other than those described and shown. In the embodiments shown the support members and pressure members are separate elements. They may, however, in certain cases be formed in one piece and have the combined function of being supporting and pressure members.

I claim:
1. A joint structure comprising two elements disposed adjacent one another in pressure engagement with sealing means disposed between said elements, at least one of said elements being fabricated of a comparatively fragile material, said one element having an outwardly directed tapered flange adjacent said sealing means defining an increasing cross section in the direction toward said sealing means and having inclined exterior surface, a coupling member disposed in spaced relation to both of said elements and to said flange, fastening means extending in spaced relation to said flange between said coupling member and the other one of said elements, a pressure member having a surface corresponding in shape to, and in contact with, said inclined exterior surface of said flange, support means extending between said coupling member and said pressure member for holding said pressure member in surface engagement with said inclined exterior surface of said flange, and a clamping member positioned adjacent said coupling member and in engagement with said support means for holding said pressure member in pressure contact with said inclined exterior surface of said flange, the shape and expansion coefficients of said coupling member, said fastening means, said pressure member, said support means, and said clamping member being so adjusted in relation to one another that, upon occurrence of temperature variations, said pressure member remains substantially stationary relative to said inclined flange surface whereby both said contact pressure, and the pressure between said elements and said sealing means, are maintained substantially constant.

2. The structure of claim 1 wherein said pressure member and said support means respectively comprise two interconnected parts one of which engages said coupling member and the other of which engages said inclined flange surface.

3. The joint structure of claim 1 wherein said pressure member and said support means are integral with one another.

4. The joint structure of claim 1 wherein said support means comprises a plurality of tongues formed integrally with said coupling member.

5. The joint structure of claim 1 wherein said one element and its tapered flange are formed of quartz.

6. The joint structure of claim 5 wherein said other element is formed of metal.

7. The joint structure of claim 6 wherein said other element includes a metallic flange, said fastening means engaging said metallic flange.

8. The joint structure of claim 1 wherein each of said elements is circular in cross section, said elements being disposed in coaxial relation to one another, said coupling member and said clamping member each comprising annular elements disposed concentrically around and in spaced relation to the exterior of said one element.

9. The joint structure of claim 1 wherein said clamping member includes a protruding bead engaging said support means.

10. The joint structure of claim 1 wherein said fastening means comprises a plurality of screws extending from said coupling member into thread engagement with a portion of said other element, said screws being operative to hold said joint structure in its assembled condition and being adjustable to control said sealing pressure and said contact pressure.